March 20, 1956  G. H. SMITH ET AL  2,738,672
ANTI-FOGGING METERS
Filed May 25, 1953
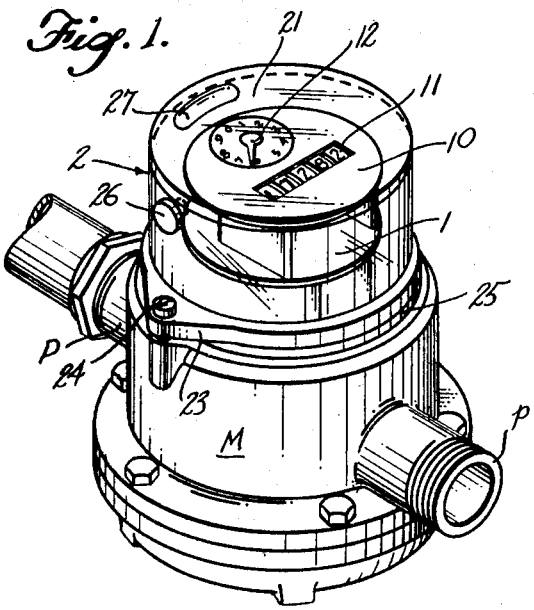
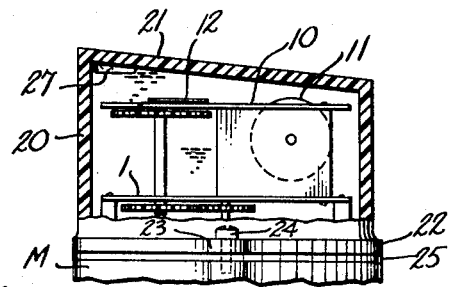
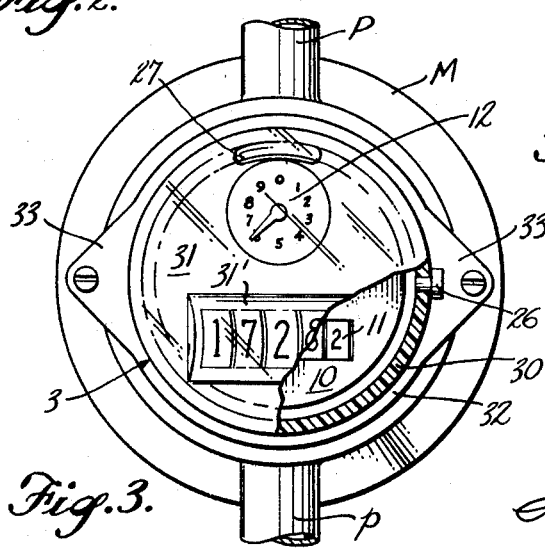
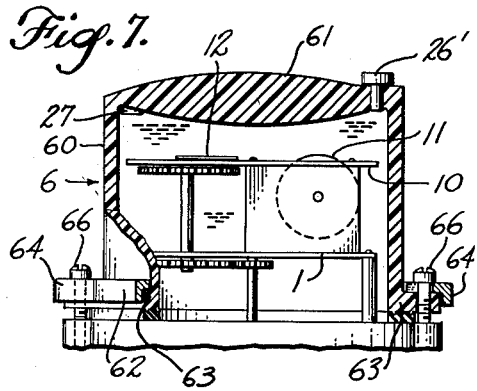
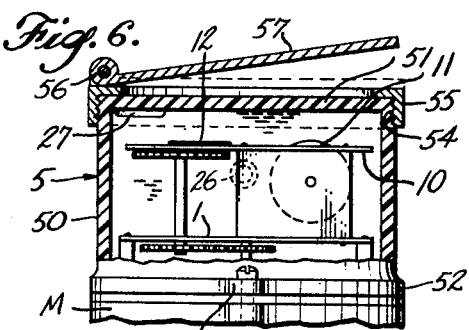
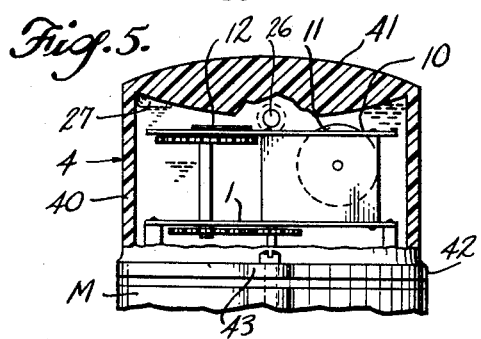
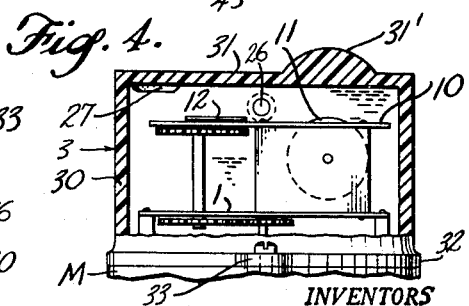
INVENTORS
GROVER H. SMITH
RICHARD D. WANS
BY
Reynolds, Beach & Christensen
ATTORNEYS

United States Patent Office 2,738,672
Patented Mar. 20, 1956

2,738,672

ANTI-FOGGING METERS

Grover H. Smith and Richard D. Wans, Seattle, Wash.

Application May 25, 1953, Serial No. 357,054

3 Claims. (Cl. 73—272)

The present invention relates to an improvement in meters and particularly such meters as are normally located in damp places, for example water meters, and especially such meters disposed with their dials substantially in a horizontal plane.

Water meters ordinarily are located in a hole in the ground outside of a building so that they are subjected to ground water and other high humidity conditions. Also, the temperature in the ground during the summer normally is lower than atmospheric temperature, so that during humid weather such water meters tend to "sweat" or to collect moisture. This is further promoted by the cooling of the meter's metal parts by conduction of heat to the cold water flowing through the meter.

Heretofore the accumulating mechanism and indicating dial or dials of a water meter have been housed in a metal casing provided with a glass window, through which it was intended that the reading of the dial or dials should be observed. Such casings, however, have not been airtight and moisture has condensed on the inner side of such windows, so that it was difficult, if not impossible, to see through the fogged glass sufficiently clearly to ascertain the meter reading. Various expedients have been proposed for overcoming the fogged condition of the meter window with little success, so that it has frequently been necessary to break the glass of the window in order to obtain the reading.

A further disadvantage of prior meter structures is that because of the condensation within the casing mentioned above the atmosphere surrounding the meter mechanism has been extremely humid and conducive to oxidation. Especially because some of the parts of the meter mechanism either turn very slowly or move only at infrequent intervals, some elements of the mechanism tend to be frozen by corrosion to cause a meter failure. The condition of the mechanism within a metal casing cannot be examined without taking off the casing for periodic inspection purposes.

Still another disadvantage inherent in customary meters is present even when the fogging and other disadvantages mentioned above are absent. As pointed out, water meters in particular are usually located in a hole in the ground, so that it is necessarily a considerable distance from the eye of the observer or meter reader. If the meter is to be kept reasonably compact, however, the dials must be reasonably small. Consequently, it is difficult for an observer to ascertain the meter reading even from an eye level close to the ground surface.

A meter incorporating the features of the present invention overcomes the various disadvantages of previous meters discussed above, assuring clear visibility of the meter dial through a casing window by the complete absence of fog or condensation on the window, and in addition the window may have magnifying characteristics so that the dial or the reading indication portion of it will be magnified substantially.

A further advantage is that not only is fogging of the dial observation window prevented, but condensation within the entire meter mechanism casing is eliminated. Moreover, it is preferred that the case permit inspection of such mechanism at any time without removal of the case.

These advantages are accomplished by providing an airtight and liquid-tight casing covering the meter mechanism which preferably is entirely transparent, or at least has a transparent window through which the meter mechanism dial is visible. Such casing is almost entirely filled with oil, and the case is formed or positioned so that an air bubble at the oil surface will not appreciably obscure the meter dial observation window. Such oil serves the triple function of preventing fogging of the window, eliminating condensation of moisture within the casing, and lubricating the meter mechanism. The window of the casing or the portion of it in registry with the register portion of the dial may be formed of lens cross section, so as to magnify the register.

Particular features and advantages of representative examples of meter casings incorporating the present invention are discussed in the following detailed description of the meter casing types illustrated in the drawings.

Figure 1 is a top perspective view of a water meter incorporating the present invention, and Figure 2 is a side elevation view of a portion of such meter with part of the casing broken away.

Figure 3 is a plan view of a meter having a different type of casing with a portion thereof broken away, and Figure 4 is a side elevation view of a portion of the same meter with part of the casing broken away.

Figure 5 is a side elevation view of a portion of a meter provided with another type of casing, part of which is broken away.

Figure 6 is a side elevation view of a portion of a meter equipped with a casing of a further form with part of it broken away.

Figure 7 is a side elevation view of a portion of a meter having still a different type of casing, of which parts are broken away.

The meter M illustrated in the drawings may be any of various conventional types used for metering water consumption or for other purposes. The particular meter configuration, meter mechanism and register are only intended to represent a typical example of a meter to which the present invention may be applied. It will be understood, therefore, in the subsequent description of the meter casings, their dimensions and shapes may be modified as necessary to fit any particular make and style of meter within a wide range.

In the usual water meter the meter mechanism 1 is mounted on top of the meter body and is housed within a case secured to the meter body, provided with a window in registry with the meter dial 10, through which the register or registers can be observed. In the particular style of meter illustrated the principal register 11 is composed of a series of number-bearing drums arranged coaxially. An auxiliary register 12 is also provided. None of this meter mechanism constitutes part of the present invention, and consequently need not be described in detail.

Housing the meter mechanism 1 and dial 10 is a casing 2 which, as shown in Figures 1 and 2, is of transparent material so that the entire meter mechanism may be inspected through it without removing the casing. While it is preferred that this casing be molded in a single piece and made of plastic, it can be fabricated from stock plastic shapes or molded of glass.

The casing type of Figure 1 includes a cylindrical wall 20, a flat end wall 21 closing one end of the cylindrical wall, a flange 22 encircling the opposite end of the cylindrical wall, and ears 23 projecting from opposite sides of such flange. These ears are apertured to receive screws 24 for securing the casing to the meter body. Between the flange 22 and the meter body is a rubber gasket ring 25 compressed by the pressure of the screws 24 to effect an airtight and liquid-tight seal between the casing and meter body.

In the side of the casing 2 preferably located at ninety degrees to the meter connecting pipes P is an aperture closed by a plug 26. This plug may have a threaded body and a knurled head, and the wall 20 may be tapped so that the plug can be screwed into place with the fingers. If necessary it may have a sealing gasket beneath its head to insure a tight seal. Through this aperture the casing 2 may be substantially filled with oil when the meter is turned on its side, either prior to installation or after the pipes P have been loosely connected in place by swinging the meter about the axis of such pipes.

For this purpose the oil may be a light mineral oil which is clear, has lubricating qualities and may be colorless, although light colored oil is quite suitable. It is important only that the oil be reasonably transparent so that a depth of a half-inch or so can readily be seen through. Preferably the space within the casing is not quite completely filled with oil, leaving an air bubble 27 which may accommodate any differential expansion or contraction between the oil and the casing as the meter is subjected to temperature changes. As shown best in Figure 2, the end wall 21 may be inclined slightly relative to the axis of the cylindrical wall 20, so that this air bubble will rise to the highest part of the casing and be elongated circumferentially of the casing to be out of registry with the registers 11 and 12 of the dial if possible. These registers may therefore be observed through the transparent end 21 constituting a window and the depth of oil between the dial 10 and such end wall.

Because of the intimate contact of the oil with the transparent end wall 21 there is no space in which moisture or fog can collect on the inner surface of the wall constituting the window. Similarly, because of the contact of the oil with the inner surface of the cylindrical wall 20, no condensation can occur on this surface. Even though the air in the bubble 27 may be humid, such bubble will extend over such a small area of the casing wall surface that any fogging of such wall portion will not be objectionable. Any moisture which might find its way into the casing in any manner would, moreover, sink to the bottom so that the oil would still be in contact with substantially the entire inner wall of the casing. The lubricating qualities of the oil will serve to keep free the meter mechanism and inhibit corrosion, both because of the protective character of the oil and the function of the oil in excluding moisture from the casing.

While, as previously mentioned, the casing 2 shown in Figures 1 and 2 could be molded of plastic material or glass in a single piece, it could also readily be fabricated, the end 21 being flat, and the flange 22 could be cut from sheet plastic and the cylindrical portion 20 of the casing could be cut from cylindrical plastic material. One end of the tube would be cut inclined and bonded to the end 21, and the flange 22 could be bonded to the other end of the cylindrical wall.

In the meter casing 3 shown in Figures 3 and 4 the side wall 30, flange 32 and ears 33 correspond to the side wall 20, flange 22 and ears 23 of the casing shown in Figures 1 and 2. In this casing, however, the end 31 is flat and disposed in a plane perpendicular to the axis of the cylindrical wall 30 instead of being in a plane inclined relative to that axis, except that over the register 11 of the meter dial 10 the end has a thickened projecting portion 31', preferably of cylindrically convex shape, which constitutes a magnifying or lens portion of the casing end. The casing may be molded with this projection as an integral part of it, or the projection could be formed as a separate piece and bonded to the upper side of a plane end wall constituting the window portion of the casing.

With the end wall 31 perpendicular to the axis of the cylindrical wall 30, it would appear that the air bubble 27 in the oil-filled casing might lodge beneath the lens portion 31'. Even if this did occur the chances of any fog occurring in the air bubble are very slight, but actually it is necessary to have the wall 31 absolutely level in order to keep the bubble in its central portion, and this is extremely unlikely. In any event, if the meter is merely tapped the bubble will move to the side almost invariably. If it is desired to insure that the bubble will be at the side, the meter can be tilted slightly.

While the projection 31' has been shown only on the upper surface of the wall 31, it could instead be on the under side of this wall or the window could be of double convex shape if desired.

In Figure 5 the casing 4 again includes a cylindrical side wall 40 having a flange 42 with ears 43 corresponding to the side wall 20, flange 22 and ears 23 of the meter casing shown in Figures 1 and 2. In this instance, however, the end surface 41 instead of planar is of lenticular or double convex cross section so that it constitutes a magnifying window extending over the entire meter dial instead of having only a localized magnifying portion as in the meter casing of Figures 3 and 4. Depending upon the degree of magnification desired, the sharpness of convexity of the cover curvature could be altered, or, if preferred, the lens might even be convex on one side only and the other side plane.

As long as the bottom surface of the wall 41 is convex, the bubble 27 cannot lodge in the center of the casing but will migrate to the corner portion at some location about the circumference of the casing. Oil will therefore be in contact with the entire central portion of the lower or inner wall surface. Even if the inner surface is plane, as suggested, the bubble will in all probability move to the side of the casing as discussed in connection with Figures 3 and 4.

Like the casings shown in Figures 1 to 5, inclusive, as described above, the casing 5 of Figure 6 is made of transparent plastic or glass and has a side wall 50, flange 52 and ears 53 similar to the corresponding elements 20, 22 and 23 of the meter casing shown in Figures 1 and 2. The end wall 51 of this casing is flat and of uniform thickness, although its inner surface could be convex if desired to afford magnifying properties. As discussed with relation to the meter shown in Figures 3 and 4, the casing can be tipped slightly if desired so that the bubble 27 will rise to the edge. The particular casing shown in this figure affords greater protection to the casing than the structures described previously. In this instance the end of the cylindrical wall adjacent to the end wall 51 has threads 54 complemental to internal threads formed on a ring 55, which may be of any desired width. This ring is of angle cross-sectional shape, having a flange overlying the marginal portion of the end wall 51. On this flange is mounted a hinge 56, carrying a cover 57, swingable upwardly to expose the end wall 51 constituting the window. Except when the meter is being read the cover 57 will be kept closed to protect the window from being struck by an object which may be dropped onto the meter. Consequently the ring 55 and lid 57 should be of sturdy metal construction.

The meter casing cup 6 shown in Figure 7 has a transparent cylindrical wall and double convex top like that of the casing cup 4 shown in Figure 5. The principal difference is that the transparent cylindrical wall 60 does not have the filler opening for the oil but such opening is provided at one side of the double convex cover 61. This aperture is closed by a plug 26', as shown.

Like the casing cup shown in Figure 5, this casing cup of Figure 7 is made of plastic, but especially for meter casings required to withstand considerable pressure produced on the oil substantially filling the cup by fluid flowing through the meter, a more rugged anchoring arrangement is provided. Such anchoring is in the form of a rigid metal retainer ring 62 of angular cross section, which fits over the casing and engages the flange 63 formed about its base. This metal ring has projecting portions 64 which encompass the opposite ears of the flange 63 and are apertured to receive the anchoring screws 66 which screw into the meter base M.

The ring 62 may be of any suitable metal such as brass or bronze. This ring will press evenly about the flange of the meter casing so that such flange is not subjected to any localized stress. Moreover, as shown in Fig. 7, the ring is of angle cross section and has a flange extending axially of the plastic casing cup 6 which encircles the flange 63 of such cup and is in radial registry with such flange over a major portion of its axial width. The ring flange thus peripherally confines the casing cup flange to restrain its expansion by the oil in the casing cup subjected to pressure by the fluid flowing through the meter.

We claim as our invention:

1. A meter comprising a body, meter mechanism carried by said body and having a register, a unitary casing cup of plastic material enclosing said register, transparent in that portion in registry with said register to render it visible through said casing cup, and having a flange encircling the casing cup base with apertures therethrough, a metal ring encircling said casing cup, engaging said flange and having ears projecting radially therefrom apertured in registry with the apertures of said casing cup flange, screws received in the apertures of said ears, extending through the apertures in said casing cup flange and secured in said body, and oil at least substantially filling said casing cup in which said register is immersed.

2. A meter comprising a body, meter mechanism carried by said body and having a register, a unitary casing cup of plastic material enclosing said register, carried by said body, and including a transparent end window through which said register is visible, and a side wall having one edge integral with the windowed casing cup end and a flange encircling its other edge and disposed in sealed engagement with said body, a rigid retainer ring encircling said casing cup, overlying said flange and securing said flange to said body in such sealed engagement, the windowed end of said casing cup having an oil filler opening therein, oil at least substantially filling said casing cup in which said register is immersed, and plug means closing said oil filler opening.

3. A meter comprising a body, meter mechanism carried by said body and including register mechanism, a unitary top of plastic material covering said register mechanism and including a side wall and an end wall integral with one end of said side wall and transparent in that portion in registry with said register mechanism to render it visible through said unitary top, means securing said top to said body with the other edge of said side wall sealed relative to said body, said end wall having therein a port for receiving oil, oil at least substantially filling said top in which said register mechanism is immersed, and plug means closing said port.

References Cited in the file of this patent

UNITED STATES PATENTS

| | | |
|---|---|---|
| 165,673 | Helme | July 20, 1875 |
| 350,619 | Creuzbaur | Oct. 12, 1886 |
| 855,473 | McAlpine | June 4, 1907 |
| 957,082 | Nash | May 3, 1910 |
| 1,893,177 | Mylius et al. | Jan. 3, 1937 |
| 2,246,250 | Hanks et al. | June 17, 1941 |
| 2,380,215 | Caldara | July 10, 1945 |
| 2,410,852 | Whittaker | Nov. 12, 1946 |
| 2,413,252 | Smith | Dec. 24, 1946 |
| 2,647,235 | Hogenbirk | July 28, 1953 |
| 2,647,404 | Whitworth | Aug. 4, 1953 |

FOREIGN PATENTS

| | | |
|---|---|---|
| 651,056 | Great Britain | Mar. 7, 1951 |